United States Patent
Youssef et al.

(10) Patent No.: US 11,151,540 B2
(45) Date of Patent: Oct. 19, 2021

(54) DEVICE AND METHOD FOR SECURE IDENTIFICATION OF A USER

(71) Applicant: WORLDLINE SA/NV, Brussels (BE)

(72) Inventors: Mohamed Amine Youssef, Machelen (BE); Chistophe Cavigneux, Orbais (BE); Pierrot Baesens, Sint-Pieters-Leeuw (BE); Philippe Lesire, Kontich (BE)

(73) Assignee: WORLDLINE SA/NV, Brussels (BE)

( * ) Notice: Subject to any disclaimer, the term of this patent is extended or adjusted under 35 U.S.C. 154(b) by 230 days.

(21) Appl. No.: 16/431,216

(22) Filed: Jun. 4, 2019

(65) Prior Publication Data
US 2019/0370772 A1 Dec. 5, 2019

(30) Foreign Application Priority Data

Jun. 4, 2018 (BE) .................................. 2018/5368

(51) Int. Cl.
*G06Q 20/20* (2012.01)
*G06Q 20/32* (2012.01)
*G06Q 20/38* (2012.01)
*H04M 1/72409* (2021.01)

(52) U.S. Cl.
CPC ....... *G06Q 20/206* (2013.01); *G06Q 20/3227* (2013.01); *G06Q 20/3823* (2013.01); *H04M 1/72409* (2021.01)

(58) Field of Classification Search
CPC ............. G06Q 20/206; G06Q 20/3227; G06Q 20/3823; G06Q 20/353; G06Q 20/327; G06Q 20/4012; G06Q 20/382; H04M 1/72409; G06F 21/36; G06F 21/35; G07F 7/1091

See application file for complete search history.

(56) References Cited

U.S. PATENT DOCUMENTS

| | | | | |
|---|---|---|---|---|
| 6,527,171 | B1 * | 3/2003 | Brooks | ..................... G07F 9/02 235/379 |
| 7,146,577 | B2 * | 12/2006 | Hoffman | ............... G06F 1/1626 715/865 |
| 8,392,846 | B2 * | 3/2013 | Carapelli | ............. G06Q 20/206 715/773 |
| 9,681,305 | B2 * | 6/2017 | Colegate | ............ G06Q 20/4016 |
| 2008/0218490 | A1 * | 9/2008 | Kim | ..................... G06F 3/04883 345/173 |
| 2010/0205523 | A1 * | 8/2010 | Lehota | ................ G06F 16/9577 715/235 |
| 2011/0119289 | A1 * | 5/2011 | Fields | ..................... G06F 9/445 707/769 |

(Continued)

*Primary Examiner* — Fahd A Obeid
*Assistant Examiner* — Michael Jared Walker
(74) *Attorney, Agent, or Firm* — Hauptman Ham, LLP

(57) ABSTRACT

A portable payment or retail terminal with jack connector and a method for secure identification of a cardholder. The terminal comprises a set of devices and arrangement for implementing the method, which comprises at least detecting if the cardholder has a mobile device, configuring the terminal for launching an accessibility mode on the mobile device of the cardholder, and transmitting a request to the mobile device for sending a PIN to the terminal. When receiving a communication from the mobile device including information, the method includes deciphering the information to obtain the PIN code and validating the transaction.

24 Claims, 7 Drawing Sheets

(56) References Cited

U.S. PATENT DOCUMENTS

| | | | | |
|---|---|---|---|---|
| 2012/0130839 A1* | 5/2012 | Koh | G06Q 20/325 | 705/26.1 |
| 2012/0150747 A1* | 6/2012 | Carey | H04L 9/0827 | 705/71 |
| 2013/0087612 A1* | 4/2013 | Locher | G06Q 20/38 | 235/380 |
| 2013/0328801 A1* | 12/2013 | Quigley | H04L 9/3226 | 345/173 |
| 2014/0244514 A1* | 8/2014 | Rodriguez | G06Q 20/3223 | 705/71 |
| 2014/0245020 A1* | 8/2014 | Buldas | H04L 9/3257 | 713/177 |
| 2014/0258110 A1* | 9/2014 | Davis | G06Q 30/0611 | 705/41 |
| 2015/0081559 A1* | 3/2015 | Dua | G06Q 20/40 | 705/44 |
| 2015/0126262 A1* | 5/2015 | Litos | G07F 17/3206 | 463/17 |
| 2015/0227922 A1* | 8/2015 | Filler | G06F 3/0412 | 705/41 |
| 2015/0242038 A1* | 8/2015 | Steiner | G06F 3/041661 | 345/173 |
| 2015/0248664 A1* | 9/2015 | Makhdumi | G06Q 20/3276 | 235/380 |
| 2015/0371213 A1* | 12/2015 | Pike | G06Q 20/322 | 705/72 |
| 2016/0012433 A1* | 1/2016 | Marenick | G06Q 20/4014 | 705/72 |
| 2016/0189277 A1* | 6/2016 | Davis | B62B 5/0096 | 705/26.8 |
| 2016/0212103 A1* | 7/2016 | Rhoads | H04W 12/02 | |
| 2016/0224113 A1* | 8/2016 | Day | G06F 3/04886 | |
| 2016/0364723 A1* | 12/2016 | Reese | G06Q 20/4012 | |
| 2017/0061563 A1* | 3/2017 | Falkenstern | C09D 11/50 | |
| 2017/0104859 A1* | 4/2017 | Dylmer | H04M 1/72454 | |
| 2017/0140355 A1* | 5/2017 | Hunting | G06Q 20/18 | |
| 2017/0206521 A1* | 7/2017 | Maddocks | G06Q 20/102 | |
| 2017/0270509 A1* | 9/2017 | Colegate | H04W 12/08 | |
| 2017/0286938 A1* | 10/2017 | Brown | G07F 7/0806 | |
| 2017/0295148 A1* | 10/2017 | Wright | H04L 63/166 | |
| 2017/0339054 A1* | 11/2017 | Yadav | H04L 41/5054 | |
| 2018/0060584 A1* | 3/2018 | Ahuwanya | G06F 21/577 | |
| 2018/0099630 A1* | 4/2018 | Todasco | H04W 8/183 | |
| 2018/0146360 A1* | 5/2018 | Uchiyama | H04W 68/00 | |

* cited by examiner

DEVICE AND METHOD FOR SECURE IDENTIFICATION OF A USER

FIELD OF INVENTION

The present invention relates to the field of authentication and/or control of the identity of a user requiring a service or proceeding to a transaction, more precisely the invention concerns a device and method for identifying a person and, which also supports visual impaired persons.

BACKGROUND OF THE INVENTION

The purpose of the invention is to increase security when user enter identification code such as for instance PIN on a touch screen.

Generally, the screen displays a PIN pad with a numerical or other value for each pad and the user select each pad corresponding each value of each digit of the PIN.

During this operation any third party may observe and memorize up to 12 digits (generally 4 or 6 digits) of the PIN then enabling a fraudulent third party to combine such information with others to make fraudulent withdrawal on the account.

An example of the drawback of this solution is represented by EP 2 791 845.

Until now terminal manufacturers were providing the displayed part with a protection against the possibility to observe the key values. This solution is not fully efficient and present the drawback to increase the volume of the terminal.

Another attempt to solve this problem was according U.S. Pat. No. 8,392,846 to display a virtual PIN pad in varying locations on a touch screen in order to prevent fraud or interception of personal identification. However, a camera could nevertheless observe each step and by reviewing the images a fraudulent third party could access to the information. The solution of the present invention is able to prevent such drawback.

SUMMARY OF THE INVENTION

The present invention has as its object to obviate certain drawback of the prior art by offering a means for secure authentication or control of identity of people including visual impaired persons.

This goal is achieved by a portable payment or retail terminal with jack connector for secure transaction comprising at least:
- a first memory for storing a set of programs or sequence of instructions to be executed on a processor of said terminal and at least a set of keys for authentication and/or ciphering non-readable from outside the terminal;
- a wire/wireless communication means detection device for detecting if a cardholder uses a mobile device;
- the terminal (1) being characterized in that it comprises at least a transaction management module comprising an arrangement for configuring the terminal (1) so as to:
  - launch an accessibility mode on the mobile device of the cardholder;
  - transmit a request to the mobile device for sending a PIN to the terminal and;
  - when receiving a communication from the mobile device including information, deciphering said information to obtain PIN code, by means of the set of keys for authentication and/or ciphering and validating the transaction.

According to another feature, on launching the accessibility mode on the mobile device, the terminal comprises at least a program to check if an owner accessibility mode application is installed on the mobile device, said application being downloaded from an application download portal, and execute an authentication of said installed accessibility mode application by means of the set of keys for authentication and/or ciphering stored in the first memory.

According to another feature, the terminal comprises at least an operating system (OS) for the creation of a virtual machine, if on the launching of the accessibility mode on the mobile device the terminal checks that no accessibility mode application is installed on said mobile device, said virtual machine being transmitted to the cardholder mobile device, when said mobile device is detected by means the wire/wireless communication means detection device terminal, so as to be installed on said mobile device.

According to another feature, the terminal comprises at least an instant-app which is pushed from the terminal into the virtual machine running on the mobile device, for executing the accessibility mode on the cardholder mobile device.

According to another feature, the terminal comprises:
- an accessibility mode application stored in the first memory and implementing all the sequence of the accessibility mode of the terminal for allowing the cardholder to validate on the screen of the terminal a transaction;
- an authentication arrangement for implementing authentication process for cardholders by entering a PIN or a sequence of numbers and letters (SNL);
- a proximity sensor for detecting the presence of a cardholder;
- a first detection device for detecting the presence in the connector of a jack plugged in for connecting a cardholder headset and comprising an arrangement for producing an electric signal for triggering the execution of the accessibility mode;
- a second detection device to detects by means of the position of the finger on the screen (14) each time a finger of the headset (2) owner touches the screen (14);

According to another feature, that the transaction management module comprises an arrangement for at least configuring said terminal to execute, if the cardholder mobile device is not detected by the wire/wireless communication means detection device, an accessibility mode wherein, at least, the terminal:
- asks by means of a notification means the connection of a headset in the jack connector of said terminal;
- executes the first accessibility mode application, after detection by means of the first detection device of a jack plugged in for connecting a cardholder headset, the screen of the terminal being scrambled and maintained in black during all the sequence of the accessibility mode;
- configures by means of a set of arrangements the screen to detect the position of the finger of the cardholder when said cardholder moves his finger on said screen to select each digit of his PIN by moving his finger on said screen.
- sends through the headset pre-registered audio signals corresponding to each position of the finger for helping the cardholder to choose the digits of his PIN;

According to another feature, the terminal comprises at least a notification means which is an audio arrangement for emitting a voice message through a speaker, included in said terminal and/or sending said voice message to the cardholder mobile device.

According to another feature, the terminal comprises at least a notification means which is a text message module for displaying information on the screen of said terminal or sending said information on the screen of the cardholder mobile device.

According to another feature, the terminal comprises both a text message module and an audio arrangement to notify the cardholder through said terminal or said cardholder mobile device.

According to another feature, the terminal comprises a set of keys stored in a sixth memory, included in the terminal, said set of keys being non-readable from outside the terminal and matching with the set of keys stored in the first memory, the set of keys stored in the sixth memory being pushed with the instant-app on the virtual machine running on the cardholder mobile device, said set of keys of the sixth memory being used for secure exchange of data and/or information between the terminal and the cardholder mobile device and registered in a memory of the cardholder mobile device where it is non-readable from outside.

According to another feature, the terminal comprises at least a set of programs sent to the mobile device of the cardholder mobile device for deleting the virtual machine and/or the instant-app running on said virtual machine, from said mobile device after the validation of the transaction.

According to another feature, the virtual machine comprises at least a set of programs to simulate each component of the payment terminal and their connection so as to implement, when running the instant-app, an accessibility mode comprising at least the accessibility mode as executed by said terminal.

According to another feature, the instant-app comprises a set of programs to simulate the functionalities of each component of the payment terminal and their connection so as to implement an accessibility mode comprising at least the accessibility mode as executed by said terminal.

According to another feature, the instant-app launched by the terminal on the cardholder mobile device comprises at least a program which execution on the cardholder mobile device allows to respond to the authentication and/or PIN request sent by the terminal.

According to another feature, the instant-app launched by the terminal on the cardholder mobile device comprises at least a program, which execution on the cardholder mobile device, retrieves from the memory of said cardholder mobile device the registered set of keys, allowing said mobile device to respond to the authentication and/or PIN request sent by the terminal.

According to another feature, the terminal comprises a memory in which transaction information related at least to the amount of the transaction and/or the merchant are registered, said information being transmitted with the PIN request to the cardholder mobile device.

According to another feature, instant-app running on the cardholder mobile device comprises at least a set of programs for configuring the cardholder mobile device, when at least a PIN entry request has been sent by said terminal, so as to:

check if a headset is plugged or not in the audio jack connector of said mobile device;
  request by means of a notification means the connection of a headset to the mobile device, if no headset is plugged in;
  launch the accessibility mode for PIN entry once a headset is plugged in;

According to another feature, the instant-app running on the cardholder mobile device comprises at least a program for retrieving the set of keys from the memory of said mobile device so as to ciphering the PIN entered by the cardholder before sending it to the terminal for the validation of the transaction.

According to another feature, the instant-app running on the cardholder mobile device comprises at least a program for scrambling and maintained in black the screen of the cardholder mobile device during all the sequence of the accessibility mode.

According to another feature, the instant-app comprises at least a program configuring the screen of the cardholder mobile device to detect the position of the finger of the cardholder when said cardholder moves his finger on said screen to select each digit of his PIN by moving his finger on said screen.

According to another feature, the instant-app comprises at least a program configuring the cardholder mobile device to send through the headset pre-registered audio signals corresponding to each position of the finger for helping the cardholder to choose the digits of his PIN, said audio signals being transmitted to the cardholder mobile device with the transaction information and the PIN requested by the terminal.

According another feature, the instant-app comprises at least a program to configurate the cardholder mobile device so as to allow the cardholder to enter his PIN number by means of an authorized third-party application.

Another goal of the present invention is to provide a process for secure authentication of a user.

This goal is obtained by means of a method for secure identification of a cardholder with a portable payment or retail terminal as described in the present application and/or a cardholder mobile device, said method comprising at least the steps of:

detecting a wire/wireless communication means of a mobile device;
the method being characterized in that if the cardholder mobile device is detected it comprises at least the step of configuring the terminal for:
  launching an accessibility mode on the mobile device of the cardholder;
  transmitting a request to the mobile device for sending a PIN to the terminal and;
  when receiving a communication from the mobile device including information, deciphering said information to obtain the PIN code and validating the transaction.

According to another feature, the method for secure identification comprises at least, on launching the accessibility mode, the steps of:
  checking if an owner accessibility mode application is installed on the mobile device;
  executing an authentication of said installed accessibility mode application.

According another feature, the method for secure identification at comprises least the steps of:
  creating of a virtual machine, if on the launching of the accessibility mode on the mobile device the terminal checks that no accessibility mode application is installed on said mobile device;

transmitting said virtual machine to the cardholder mobile device;

pushing an instant-app on said virtual machine for executing the accessibility mode on the mobile device (3).

According to another feature, the method for secure identification comprises at least the step of ciphering at least the PIN or a portion of the PIN on the cardholder mobile device before transmitting it to the terminal for validation.

According to another feature, if the mobile device is not detected, the method for secure identification comprises at least the steps of:

asking by means of a notification, on the screen of the terminal, the connection of a headset in the jack connector of said terminal;

detecting the presence of a jack plugged in the connector of the terminal for connecting a cardholder headset;

triggering the execution of a first accessibility mode allowing the cardholder to identify;

scrambling and maintaining the screen in black during the sequence of the accessibility mode;

configuring the screen to detect the position of the finger of the cardholder when said cardholder moves his finger on said screen to select each digit of his PIN by moving his finger on said screen;

sending through the headset pre-registered audio signals corresponding to each position of the finger for helping the cardholder to choose the digits of his PIN.

According to another feature, the step of executing the accessibility mode on the cardholder mobile device comprises the steps of:

checking if a headset is plugged or not in the audio jack connector of said mobile device;

requesting the connection of a headset to the mobile device, if no headset is plugged in;

launching the accessibility mode for PIN entry once a headset is plugged in.

BRIEF DESCRIPTION OF THE DRAWINGS

Other features and advantages of the present invention will appear more clearly upon reading the following description, given with reference to the appended drawings, in which.

DETAILED DESCRIPTION

The present invention concerns a portable payment or retail terminal (1) for the secure identification of a user, including a visual impaired user, during a transaction.

Figure 4:
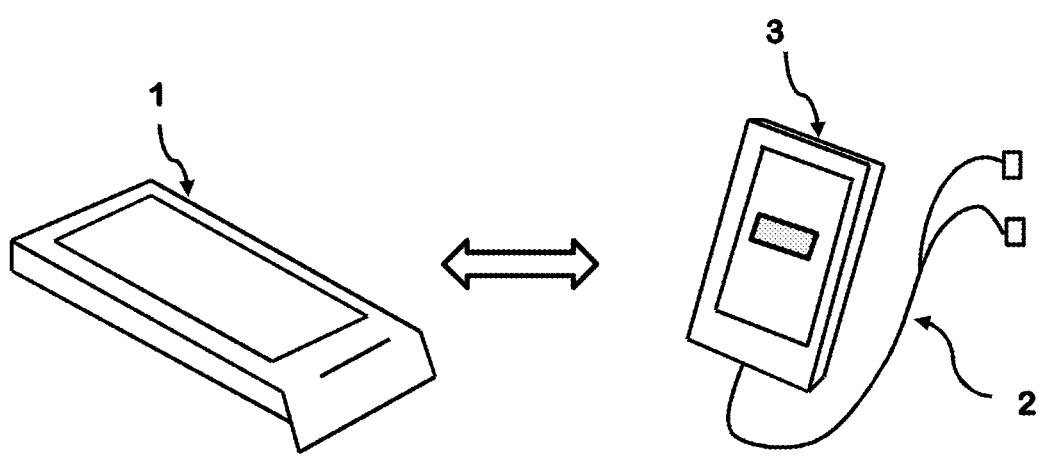
FIG. 4, is schematic representation of the terminal exchanging with the cardholder mobile device during the of the portable payment or retail terminal and the controller, according one embodiment.

In some embodiments, the portable payment or retail terminal (1, FIG. 1A, 4) with jack connector for secure transaction comprises at least:

a first memory (13) for storing a set of programs or sequence of instructions to be executed on a processor of said terminal and at least a set of keys for authentication and/or ciphering non-readable from outside the terminal;

a wire/wireless communication means (USB, Wifi, Bluetooth, . . . ) detection device for detecting if a cardholder uses a mobile device (3, FIG. 4);

the terminal (1) being characterized in that it comprises at least a transaction management module comprising an arrangement for configuring the terminal so as to:

launch an accessibility mode on the mobile device (3) of the cardholder;

transmit a request to the mobile device for sending a PIN to the terminal and;

when receiving a communication from the mobile device including information, deciphering said information to obtain PIN code, by means of the set of keys for authentication and/or ciphering and validating the transaction.

In some embodiments, on launching the accessibility mode on the mobile device (3), the terminal comprises at least a program to check if an owner accessibility mode application is installed on the mobile device, said application being downloaded from an application download portal, such as for example google playstore or Applestore, and executes an authentication of said installed accessibility mode application by means of the set of keys for authentication and/or ciphering stored in the first memory. In this case the accessibility mode application may comprises a set of keys for authentication and/or ciphering data, said keys matching the set of keys stored in the first memory of the terminal.

In some embodiments, the portable payment or retail terminal comprises at least an operating system (OS) for the creation of a virtual machine, if on the launching of the accessibility mode on the mobile device (3) the terminal checks that no accessibility mode application is installed on said mobile device, said virtual machine being transmitted to the cardholder mobile device (3), when said mobile device (3) is detected by means of the wire/wireless communication means detection device terminal, so as to be installed on said mobile device (3).

In some embodiments, the portable payment or retail terminal comprises at least an instant-app which is pushed from the terminal into the virtual machine running on the mobile device (3), for executing the accessibility mode on the cardholder mobile device (3).

By instant-app we mean, an application which may be executed instantly on the mobile device without requiring installation on said mobile device (3).

Figure 1A:
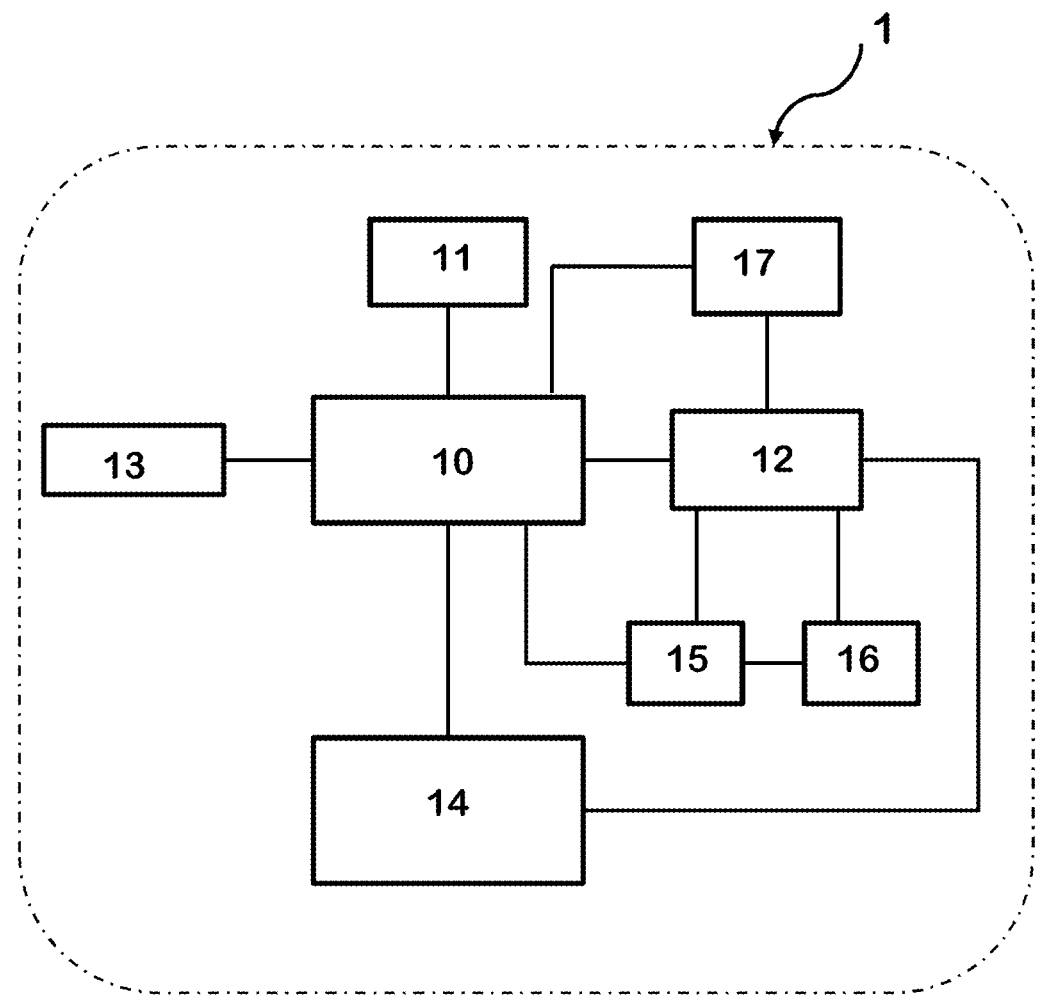
FIG. 1A, 1B are schematic representations respectively of the components of the portable payment or retail terminal and the controller, according one embodiment.
Figure 1B:
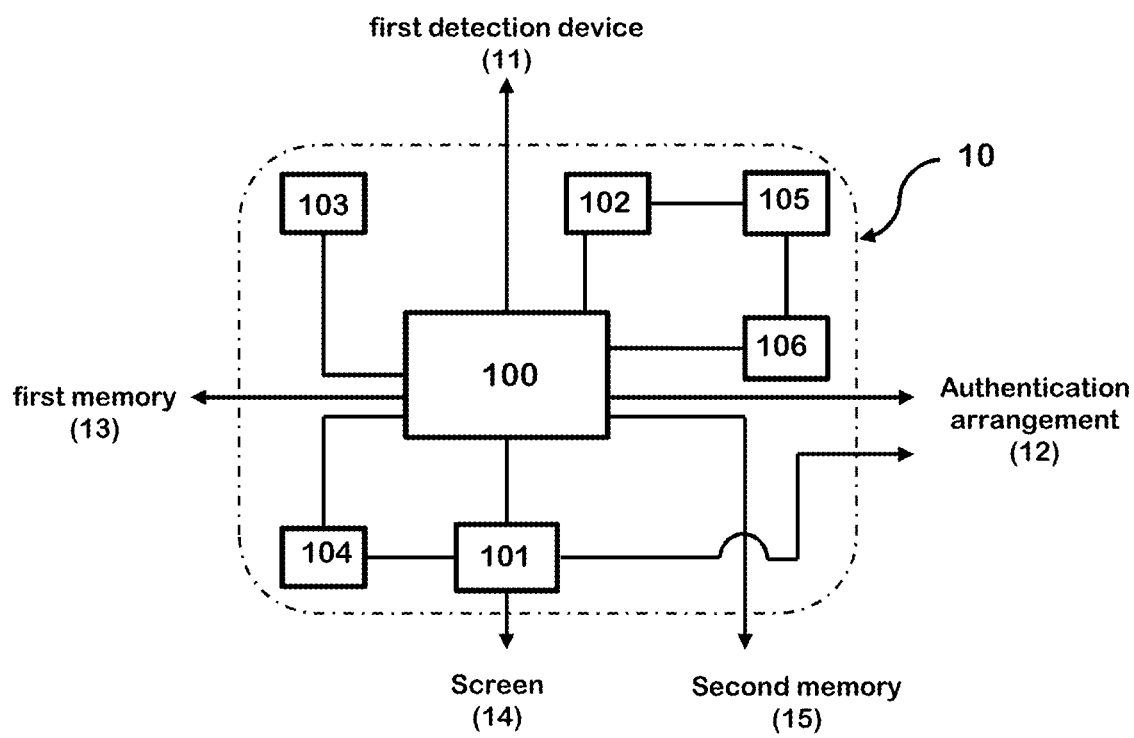

In some embodiments, the terminal (1) comprises:

an accessibility mode application stored in the first memory and implementing all the sequence of the accessibility mode of the terminal for allowing the cardholder to validate on the screen (14) of the terminal a transaction;

an authentication arrangement (12, FIGS. 1A, 1B) for implementing authentication process for cardholders by entering a PIN or a sequence of numbers and letters (SNL);

a proximity sensor for detecting the presence of a cardholder (not shown);

a first detection device (11) for detecting the presence in the connector of a jack plugged in for connecting a cardholder headset (2, FIG. 4) and comprising an arrangement for producing an electric signal for triggering the execution of the accessibility mode;

a second detection device (101) to detects by means of the position of the finger on the screen (14) each time a finger of the headset (2) owner touches the screen (14);

In some embodiments, the transaction management module comprises an arrangement for at least configuring said terminal to execute, if the cardholder mobile device (3) is not detected by the wire/wireless communication means detection device, an accessibility mode wherein, at least, the terminal:

asks by means of a notification means the connection of a headset (2) in the jack connector of said terminal;

executes the first accessibility mode application, after detection by means of the first detection device of a jack plugged in for connecting a cardholder headset (2), the screen of the terminal being scrambled and maintained in black during all the sequence of the accessibility mode;

configures by means of a set of arrangements the screen to detect the position of the finger of the cardholder when said cardholder moves his finger on said screen to select each digit of his PIN by moving his finger on said screen.

sends through the headset (2) pre-registered audio signals corresponding to each position of the finger for helping the cardholder to choose the digits of his PIN;

The terminal (1), as illustrated in FIG. 1A, comprises an arrangement connected to the authentication arrangement (12) for scrambling and maintaining the screen (14) in black during all the sequence of the accessibility mode.

Figure 2A:
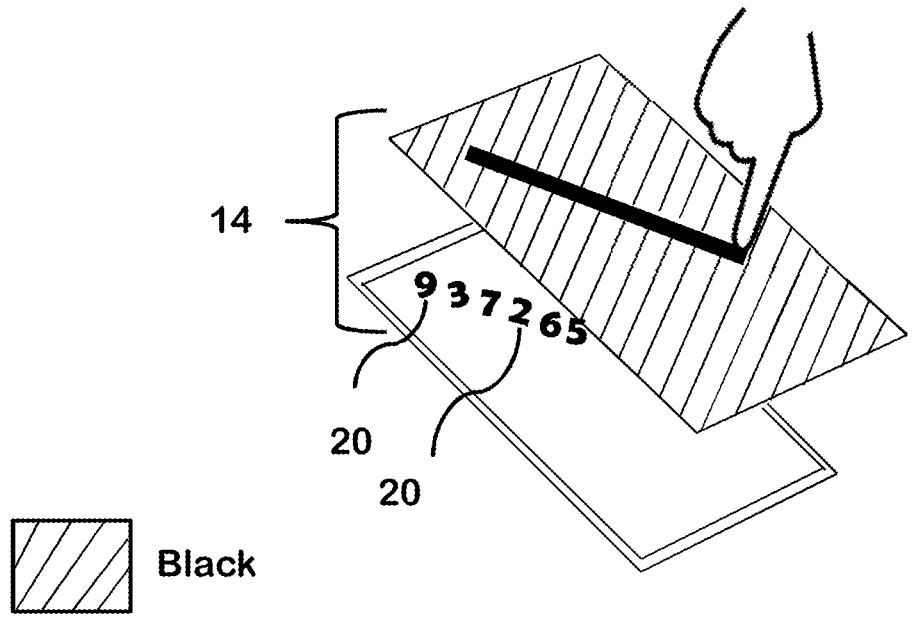
FIG. 2A, 2B are schematic representations of the PIN entry on a scrambled screen in black, according one embodiment.
Figure 2B:
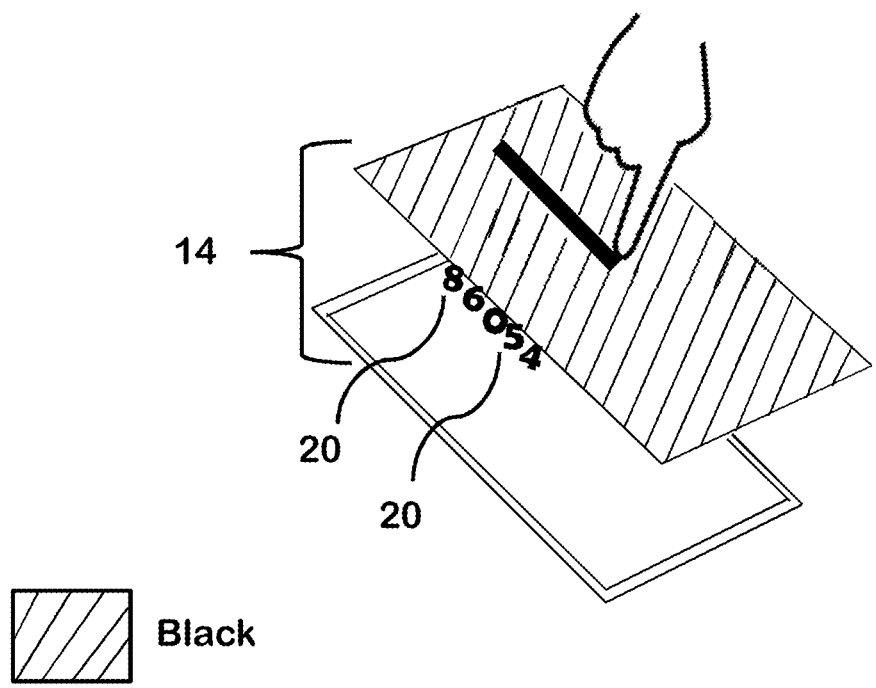

The authentication arrangement (12) may comprise a program to generate, each time the accessibility mode is on, at least a set of "chain of keys" (FIGS. 2A, 2B) memorized in a "chain file" of the terminal (1), for PIN/SNL entry, each "chain of keys" comprising a set of keys (20), said keys (20) being randomly distributed within said "chain of keys".

The second detection device (101) comprises an arrangement to detect the length, d, or the orientation of the finger's displacement on the screen and is connected to the authentication arrangement (12) so as to transmit a signal corresponding to the length d or the angle of orientation to indicate that a displacement occurs or not depending on the value of said length d or angle of orientation compared to a memorized threshold value.

The authentication arrangement may also comprise a sorting module to retrieve, when receiving a signal indicating a displacement, in the memorized "chain file" a "chain of keys" so as to attribute a value of key corresponding to the length d or the angle of orientation the finger's displacement, and is connected to an audio arrangement (17) of the terminal (1) where pre-registered audio signals corresponding to each key of the "chain of keys" are stored, so as to select the sound corresponding to the key attributed to the displacement and emit it through the jack connector towards the cardholder headset (2).

The terminal may comprise a program to reiterate these actions until the user listening the value of a digit or character of a PIN/SNL remove its finger from the screen (14), the last value, indicated as feedback, is then stored in second memory (15), included in the terminal (1), as a digit of the PIN/SNL.

By "chain of keys", we mean a successive given number of digits or characters.

The "chain of keys" may comprise at least keys (20) with values from 0 to 9 or letter from A to Z or both. For example, and without limitation, a chain generated may be "3241569807".

Each time the user touches the screen after a choice of a digit of his PIN/code, the terminal retrieves a new "chain of keys" from the "chain file".

Once a value of key (20) is chosen by the user, a double tap gesture of the finger allows to validate said choice.

It is thus obvious that the terminal describes in the present application provides a secure way to validate a transaction, since there is no key or keypad displayed on the screen (14).

In addition, since the screen is maintained in black and that the user need only to displaced is finger on the screen to select a key (20) or digit, the terminal may be used for both normal and visual impaired users.

By transaction, we mean the payment of a product or service for example.

The cardholder mobile device (3) (smartphone or tablet for example) may comprise a set of communications means such as USB cable, Wifi, NFC (Near Field Communication), Bluetooth, Visual Light Communication (VLC), . . . for connecting to the terminal.

The payment terminal may also comprise a set of communications means such as USB cable, Wifi, NFC (Near Field Communication), Bluetooth, Visual Light Communication (VLC), . . . for establishing communication with the cardholder mobile device (3).

The second accessible mode application is used as mirror application of the terminal. By launching said application, the cardholder, (normal or visual impaired person) is now able to enter the PIN on its own device. This solution has the advantage, in particular for a visual impaired person, it does not require learning how to use a new device for making a transaction, since said visual impaired know how to use his own mobile device (3) (smartphone, tablet, . . . ).

In some embodiments, the terminal (1) comprises notification means which may be an audio arrangement for emitting a voice message through a speaker, included in said terminal and/or sending said voice message to the cardholder mobile device (3).

In some embodiments, the terminal (1) comprises notification means which may be a text message module for displaying information on the screen of said terminal or sending said information on the screen of the cardholder mobile device (3).

In some embodiments, the payment terminal comprises both a text message module and an audio arrangement to notify the cardholder through said terminal or said cardholder mobile device (3).

In some embodiments, the second detection device (101) comprises an arrangement to measure the displacement or movement of the finger on the screen from a given initial position or orientation, the length of the displacement or movement being characterized by the value d or angle of orientation. The length d or the angle of orientation is compared to a threshold value memorized in said second detection device (101). If the length d or the angle of orientation is superior to the threshold value, a signal is transmitted to the authentication arrangement to indicate that there is a displacement of the finger. If on the contrary, the length d or the angle of orientation is inferior to the threshold value, the second detection device (101) considers that no displacement of the finger occurs a signal is transmitted to the authentication arrangement indicating that there is no displacement of the finger.

In some embodiments, the portable payment or retail terminal (1) may comprise a controller (10) including at least:

the second detection device (101) which is connected to the screen (14) of the terminal (1) so as to capture and register, in a third memory (104), the data related to the positions of the finger when said screen (14) is touched;

a position generator device (102), comprising an arrangement to generate data corresponding to various positions on the screen (14), said various positions being registered in a fourth memory (105);

a processor (100) and a fifth memory (103) comprising a set of programs executed on said processor (100) so as to avoid the touch screen (14) to display a "chain of keys" with the keys (20) positions determined by the data generated by the position generator device (102);

the set of programs of the fifth memory of said controller (10) comprising at least:

a comparison algorithm to compare the touched region corresponding data, registered in the third memory, with the data representative of each location of the screen generated by the position generator device and registered in the fourth memory;

an audio algorithm to produce in a headset (2) connected to the jack an audible signal corresponding to the value of the key (20);

a first iteration algorithm to reiterate the comparison algorithm and audio algorithm until the user listening the value he expects remove the finger from the screen (14), such action triggering on the memory the memorization of said value as a first digit;

a second iteration algorithm to further reiterate the first iteration algorithm each time the authentication arrangement receives a new touch detection signal and as long as the number of digit value memorized is lower than the maximum value of digit numbers contained by PIN or identifying code.

In some embodiments, the first detection device (11) is connected to the controller (10) so as to transmit the electric signal for triggering the accessibility mode.

In some embodiments, the processor of the controller is connected to the first memory for downloading and executing a sequence of instructions representing the accessibility mode when receiving the said electrical signal.

In some embodiments, the controller (10) is connected to the authentication arrangement (12) so as to transmit to it an activation signal when the accessibility mode is on, the authentication arrangement (12) generating the "chains of keys" for identification of the cardholder after receiving said activation signal.

In some embodiments, the controller (10) transmits a set of data, comprising at least the position values generated by the position generator device (102), to the authentication arrangement (12), said authentication arrangement (12) generating the "chain of keys" on a location of the screen (14) base on said set of data.

In some embodiments, the authentication arrangement is connected to the second detection device so as to retrieve a "chain of keys" in the "chain file" when said second detection device (101) detects the finger on the screen. When the second detection device detects a displacement or movement of the finger on the screen said authentication arrangement attributes to the position of the finger a value of a key (20) of the "chain of keys". For example and without limitation, when the first displacement or movement of the finger is detected on the screen, the authentication arrangement attributes the value of the first key (20) of the "chain of keys", for example "2", to the position of the finger and a pre-registered sound or audio signal corresponding to the key "2" is retrieve and from the audio arrangement and emitted through the headset (2) of the user indicating the value of the key (20). When the second detection device detects a second displacement of movement of the finger, from the last position, the authentication arrangement attributes the value of the second key (20) of the "chain of keys", for example "7", to the position of the finger and a pre-registered sound or audio signal corresponding to the key "7" is retrieve and from the audio arrangement and is emitted through the headset (2) of the user indicating the value of the key (20), and so on until the user chooses and validates a given value.

In some embodiments, the authentication arrangement comprises a key designation module (106) which generates a key list comprising information on each key (20) of the "chain of keys" and related position, said key list being reused by said authentication arrangement if the user moving his finger in a given direction or orientation goes back to a previous position or another direction so as to correct or change a choice of key (20).

In some embodiments, the authentication arrangement comprises a program which determines, in real time, from the information contained in the key list, the direction of the finger moving on the screen so as to check if the user moves said finger forward or backward or in any orientation.

In some embodiments, the portable payment or retail terminal (1) comprises a counter (16) device connected to the authentication arrangement (12) and the second memory (15) of the terminal (1), said counter (16) device counting the number of digit memorized in the second memory (15) and when said count number matches with a predetermined value registered and representing the number of digits of the PIN/SNL, emitting a signal to said authentication arrangement (12) so as to execute the authentication process.

In some embodiments, the first detecting device is an electro-mechanical switch.

In some embodiments, the first detecting device is a sensor.

In some embodiments, the terminal (1) may comprise a set of keys stored in a sixth memory, included in the terminal, said set of keys being non-readable from outside the terminal and matching with the set of keys stored in the first memory, said set of keys stored in the sixth memory being pushed with the instant-app on the virtual machine running on the cardholder mobile device (3), said set of keys of the sixth memory being used for secure exchange of data and/or information between the terminal and the cardholder mobile device (3) and registered in a memory of the cardholder mobile device (3) where it is non-readable from outside.

In some embodiments, the terminal (1) comprises at least a set of programs sent to the mobile device (3) of the cardholder mobile device (3) for deleting the virtual machine and/or the instant-app running on said virtual machine, from said mobile device (3) after the validation of the transaction.

In some embodiments, the virtual machine comprises at least a set of programs to simulate each component of the payment terminal and their connection so as to implement, when running the instant-app, an accessibility mode comprising at least the accessibility mode as executed by said terminal.

In some embodiments, the installed accessibility mode application or the instant-app may comprise a set of programs to simulate the functionalities of each component of the payment terminal and their connection so as to implement an accessibility mode comprising at least the accessibility mode as executed by said terminal.

In some embodiments, the installed accessibility mode application or the instant-app launched by the terminal on the cardholder mobile device (3) comprises at least a program which execution on the cardholder mobile device (3) allows to respond to the authentication and/or PIN request sent by the terminal.

In some embodiments, the installed accessibility mode application or the instant-app launched by the terminal on the cardholder mobile device (3) comprises at least a program, which execution on the cardholder mobile device (3), retrieves from the memory of said cardholder mobile device (3) the registered set of keys, allowing said mobile device (3) to respond to the authentication and/or PIN request sent by the terminal.

In some embodiments, the terminal comprises a memory in which transaction information related at least to the amount of the transaction and/or the merchant are registered, said information being transmitted with the PIN request to the cardholder mobile device (3).

In some embodiments, the installed accessibility mode application or the instant-app running on the cardholder mobile device (3) comprises at least a set of programs for configuring the cardholder mobile device (3), when at least a PIN entry request has been sent by said terminal, so as to:
  check if a headset (2) is plugged or not in the audio jack connector of said mobile device (3);
  request by means of a notification means the connection of a headset (2) to the mobile device (3), if no headset (2) is plugged in;
  launch the accessibility mode for PIN entry once a headset (2) is plugged in;

In some embodiments, the instant-app or the installed accessibility mode application running on the cardholder mobile device (3) comprises at least a program for retrieving the set of keys from the memory of said mobile device (3) so as to ciphering the PIN entered by the cardholder before sending it to the terminal for the validation of the transaction.

In some embodiments, the instant-app or the installed accessibility mode application on the cardholder mobile device (3) may comprise at least a program for scrambling and maintained in black the screen of the cardholder mobile device (3) during all the sequence of the accessibility mode.

In some embodiments, the instant-app or the installed accessibility mode application may comprise at least a program configuring the screen of the cardholder mobile device (3) to detect the position of the finger of the cardholder when said cardholder moves his finger on said screen to select each digit of his PIN by moving his finger on said screen.

In some embodiments, the instant-app or the installed accessibility mode application comprises at least a program configuring the cardholder mobile device (3) to send through the headset (2) pre-registered audio signals corresponding to each position of the finger for helping the cardholder to choose the digits of his PIN. In some embodiments, the audio signals are transmitted to the cardholder mobile device (3) with the transaction information and the PIN requested by the terminal.

In some embodiments, the instant-app or the installed accessibility mode application or instant-app comprises at least a program to configurate the cardholder mobile device (3) so as to allow the cardholder to enter his PIN number by means of an authorized third-party application. For, example the cardholder may use an application such as "itsme".

"Itsme" is an application that allows a user to confirm his identity using his mobile device (3) such as a smartphone. "Itsme" uses data from the electronic identity card (eID), the SIM card of his smartphone and his smartphone to create a unique ID (identity) associated to a PIN code with.

In some embodiments, the instant-app or the installed accessibility mode application comprises at least a program to configurate the cardholder mobile device (3) so as to allow the cardholder to validate the transaction by using a fingerprints or face recognition means included in said cardholder mobile device (3).

The present invention also concerns method for secure identification of a cardholder (normal or visual impaired person) with a portable payment or retail terminal (1) as described above (in the present application) and/or said cardholder mobile device (3).

Figure 3A:
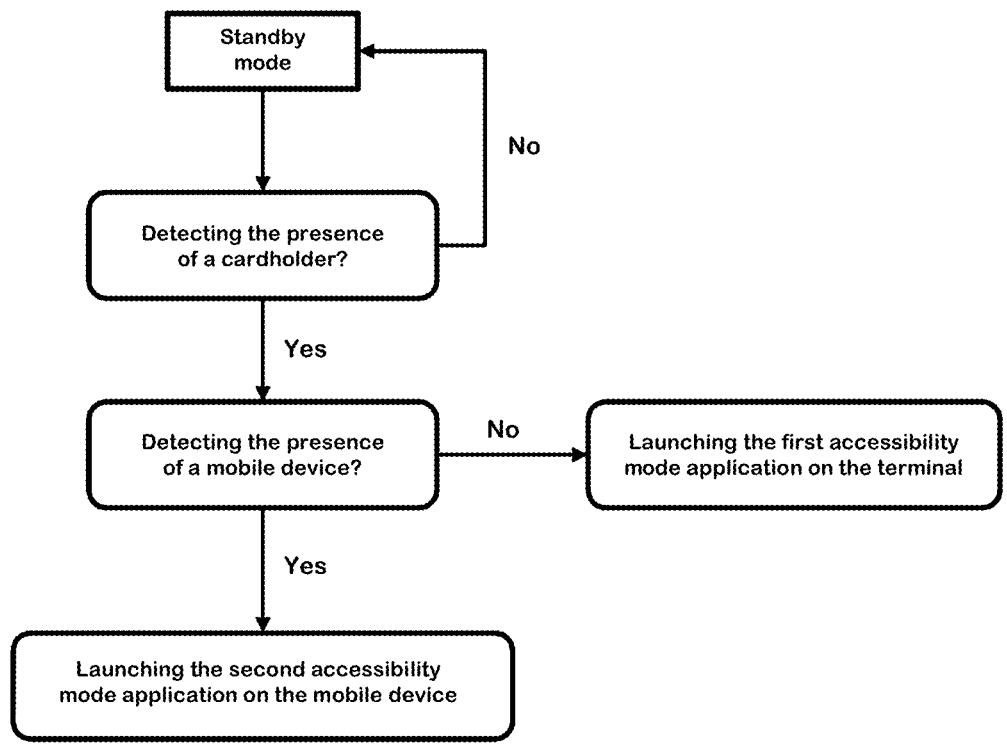
FIGS. 3A, 3B and 3C are schematic representations respectively of the authentication process, the step of said authentication process on the portable payment or retail terminal and the step of said authentication process on the cardholder mobile device (3), component of said authentication process.
Figure 3B:
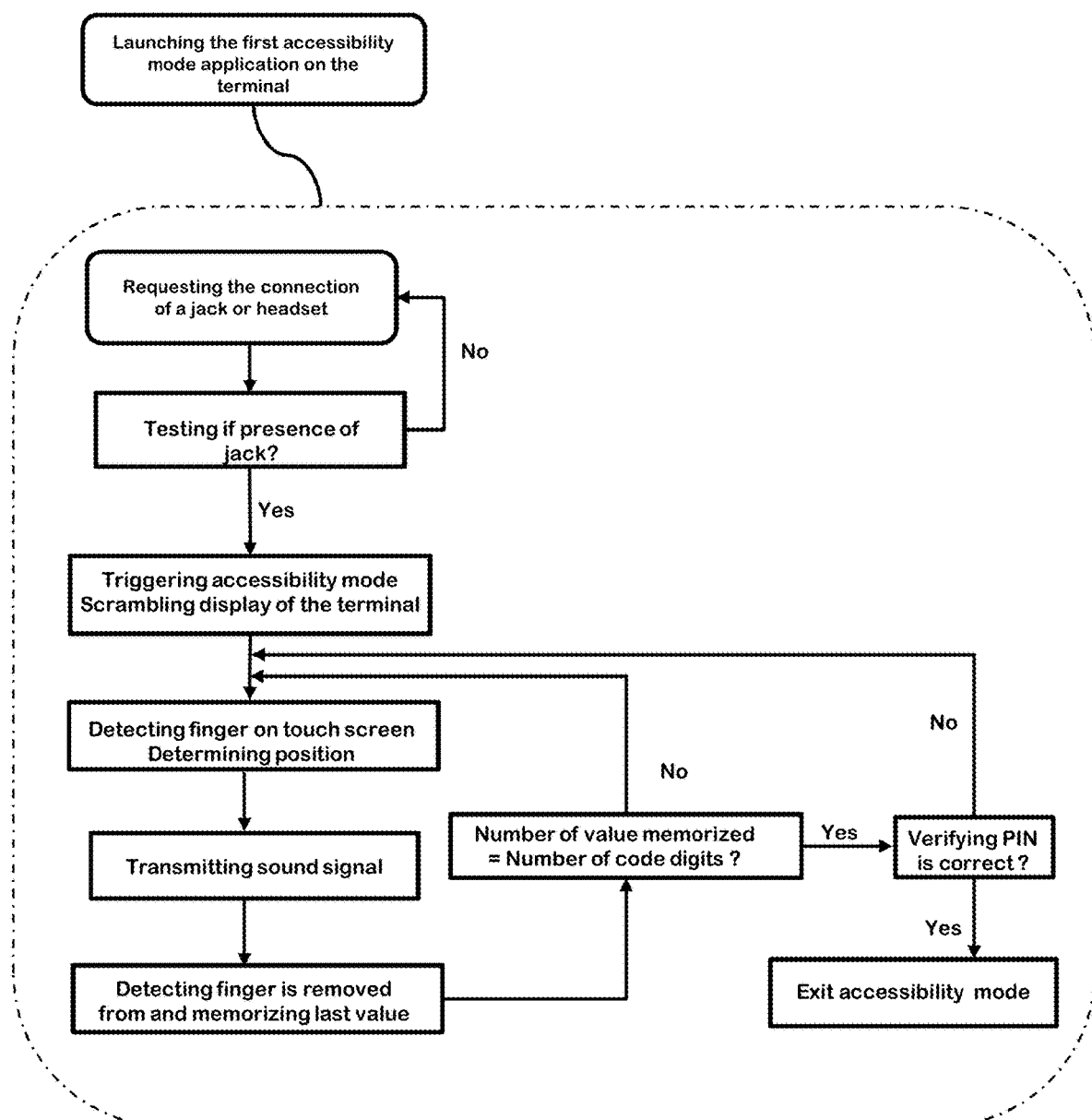
Figure 3C:
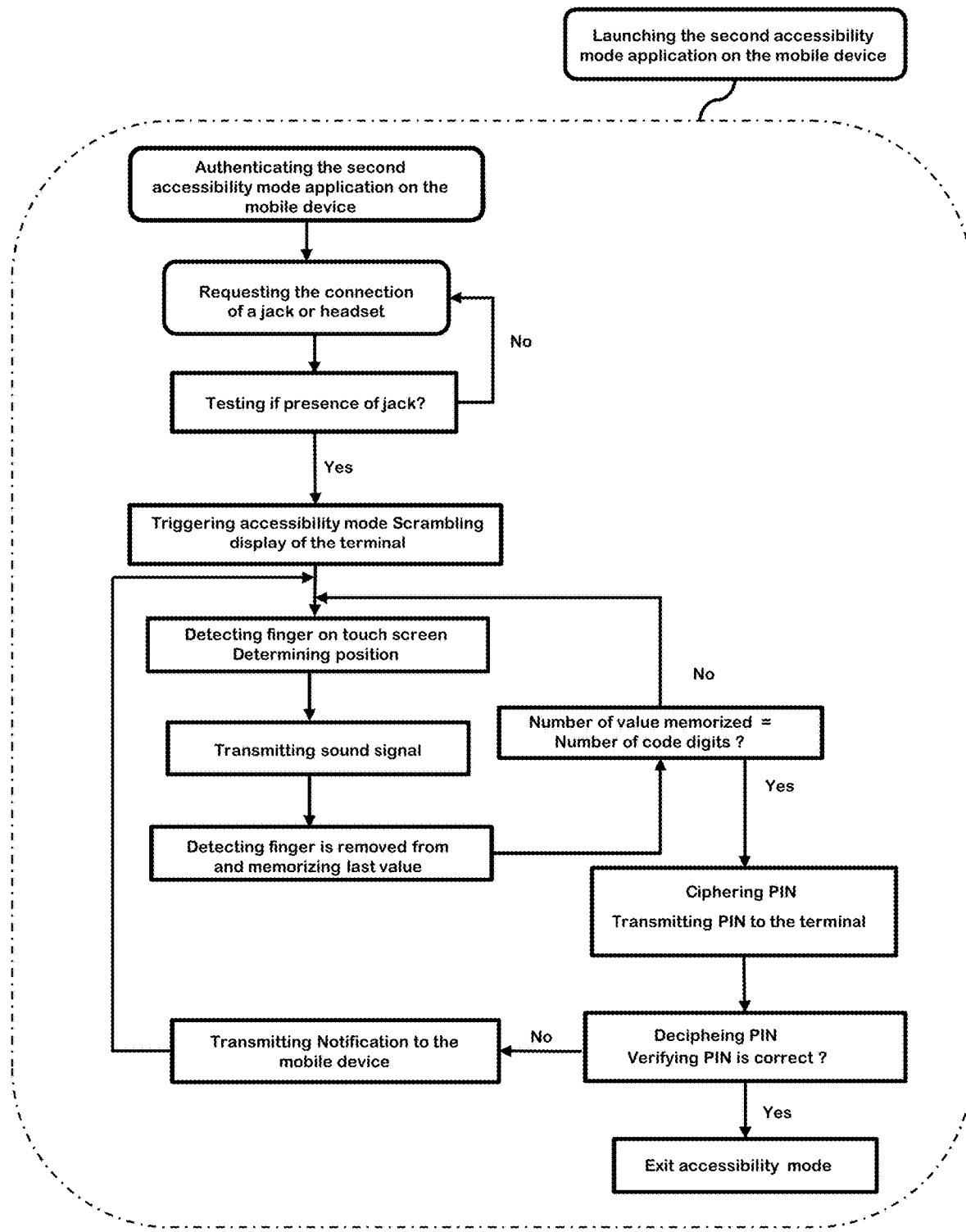

In some embodiments, the method for secure identification (see FIGS. 3A, 3 and 3C) of a cardholder comprises at least the steps of:
  detecting a wire/wireless communication means of a mobile device (3);
the method being characterized in that if the cardholder mobile device (3) is detected it comprises at least the step of configuring the terminal (1) for:
  launching an accessibility mode on the mobile device (3) of the cardholder;
  transmitting a request to the mobile device for sending a PIN to the terminal (1) and;
  when receiving a communication from the mobile device including information, deciphering said information to obtain the PIN code and validating the transaction.

In some embodiments, the method for secure identification comprises at least, on launching the accessibility mode, the steps of:
  checking if an owner accessibility mode application is installed on the mobile device;
  executing an authentication of said installed accessibility mode application In some embodiments, the method for secure identification comprises at least the steps of:
  creating of a virtual machine, if on the launching of the accessibility mode on the mobile device (3) the terminal checks that no accessibility mode application is installed on said mobile device;
  transmitting said virtual machine to the cardholder mobile device (3);
  pushing an instant-app on said virtual machine for executing the accessibility mode on the mobile device (3).

In some embodiments, the method for secure identification of a cardholder may comprise the step of ciphering at least the PIN or a portion of the PIN on the cardholder mobile device (3) before transmitting it to the terminal for validation.

In some embodiments, if the mobile device (3) is not detected, the method for secure identification comprises at least the steps of:
  asking by means of a notification, on the screen of the terminal, the connection of a headset (2) in the jack connector of said terminal,
  detecting the presence of a jack plugged in the connector of the terminal (1) for connecting a cardholder headset (2);
  triggering the execution of a first accessibility mode allowing the cardholder to identify;
  scrambling and maintaining the screen in black during the sequence of the accessibility mode;

configuring the screen to detect the position of the finger of the cardholder when said cardholder moves his finger on said screen to select each digit of his PIN by moving his finger on said screen;

sending through the headset (2) pre-registered audio signals corresponding to each position of the finger for helping the cardholder to choose the digits of his PIN In some embodiments, the step of executing the accessibility mode on the cardholder mobile device (3) may comprise the steps of:

checking if a headset (2) is plugged or not in the audio jack connector of said mobile device (3);

requesting the connection of a headset (2) to the mobile device (3), if no headset (2) is plugged in;

launch the accessibility mode for PIN entry once a headset (2) is plugged in.

In some embodiments, method for secure identification of a cardholder, comprises at least the steps of:

generating a "chain of keys" comprising a set of keys (20) not to be displayed on positions on the screen (14) of the terminal (1) for PIN/SNL entry;

detecting the length or orientation of the finger's displacement on the screen and transmitting a signal corresponding to the length d or the angle of orientation to indicate that a displacement occurs or not depending on the value of said length d or angle of orientation compared to a memorized threshold value;

retrieving, when receiving a signal indicating a displacement, in the memorized "chain file" a "chain of keys" so as to attribute a value of key corresponding to the length d or the angle of orientation of the finger's displacement, and selecting, among pre-registered audio signals corresponding to each key of the "chain of keys", the sound corresponding to the key attributed to the displacement and emit it through the jack connector towards the cardholder headset (2);

reiterating the detection and retrieving steps until the finger is removed from the screen (14);

storing the last value when removing the finger as a digit of the PIN/SNL.

In some embodiments, the method for secure identification also comprises at least the steps of:

generating a set of data corresponding to various positions on the screen (14);

generating the "chain of keys" on a location of the screen based on a subset of the set of data of various positions generated.

The present application describes various technical features and advantages with reference to the figures and/or various embodiments. Those skilled in the art will understand that the technical features of a given embodiment can in fact be combined with features of another embodiment unless explicitly stated otherwise, or unless the combination does not provide a solution to at least one of the technical problems mentioned in the present application. In addition, the technical features described in a given embodiment can be isolated from the other technical features of this embodiment unless explicitly stated otherwise.

It must be obvious to those skilled in the art that the present invention allows embodiments in many specific forms without departing from the field of application of the invention as claimed. Consequently, the present embodiments must be considered as illustrations, but can be modified in the area defined by the scope of the appended claims, and the invention must not be limited to the details given above.

The invention claimed is:

1. A portable payment or retail terminal with a jack connector for securing a transaction, the terminal comprising at least:

a touch screen configured to at least input data or information;

a first memory for storing a set of programs or sequence of instructions and at least a set of keys for authentication and/or ciphering non-readable from outside the terminal;

a processor configured to execute at least the set of programs or sequence of instructions stored in the first memory;

a first device, which is configured to be activated by the processor of the terminal to detect a cardholder mobile device used by a cardholder through a detection of wire/wireless communication device of the cardholder mobile device, the cardholder mobile device including at least a touch screen;

a communication device configured to connect to the cardholder mobile device; and a transaction control module including an arrangement for configuring the terminal, wherein the transaction control module, when executed by the processor of the terminal, causes the processor of the terminal to perform at least actions including:

launching an execution of an accessibility mode on a processor of the cardholder mobile device;

transmitting a request to the cardholder mobile device for sending a personal identification number code (PIN code) to the terminal; and when receiving a communication from the cardholder mobile device including information, deciphering said information to obtain the PIN code, by the set of keys for authentication and/or ciphering, and validating the transaction, wherein the terminal further comprises at least:

an operating system (OS) executed by the processor of the terminal and configured for creating a virtual machine if, when launching of the execution of the accessibility mode on the processor of the cardholder mobile device, the processor of the terminal checks that no accessibility mode application is installed on the cardholder mobile device, the created virtual machine being transmitted by the processor of the terminal to the cardholder mobile device so as to be installed on the cardholder mobile device by the processor of the cardholder mobile device;

an instant-app which is pushed by the processor of the terminal from the terminal to the virtual machine running on the processor of the cardholder mobile device, which causes the processor of the cardholder mobile device to execute the accessibility mode on the cardholder mobile device, and wherein the terminal further comprises a sixth memory storing a set of keys, the set of keys stored in the sixth memory being non-readable from outside the terminal and matching with the set of keys stored in the first memory, the set of keys stored in the sixth memory being pushed by the processor of the terminal with the instant-app on the virtual machine running on the processor of the cardholder mobile device, the set of keys of the sixth memory being registered in a memory of the cardholder mobile device, and the set of keys stored in the sixth memory being used by the processor of the cardholder mobile device to secure exchange of data and/or information between the terminal and the cardholder mobile device.

2. The terminal according to claim 1, wherein the terminal comprises at least a program, which, when executed by the processor of the terminal, causes the processor of the terminal
- to check if an owner accessibility mode application is installed on the cardholder mobile device when launching the accessibility mode on the cardholder mobile device, said owner accessibility mode application being downloaded from an application download portal, and
- to execute an authentication of said installed accessibility mode application by the set of keys for authentication and/or ciphering stored in the first memory.

3. The terminal according to claim 1, wherein the terminal comprises:
- an accessibility mode application stored in the first memory, which, when executed on the processor of the terminal, causes the processor to implement all the sequence of the accessibility mode of the terminal allowing the cardholder to validate a transaction on the touch screen of the terminal;
- an authentication arrangement, which, when executed on the processor, causes the processor of the terminal to implement an authentication process wherein the cardholder enters a PIN code or a sequence of numbers and letters (SNL);
- a proximity sensor for detecting a presence of the cardholder;
- a headset sensor, which is configured to be activated by the processor of the terminal to detect if a cardholder headset is connected to the terminal, the headset sensor including an arrangement to produce an electric signal for triggering the execution of the accessibility mode by the processor of the terminal if the cardholder headset is detected; and
- a finger sensor, which is configured to be activated by the processor of the terminal to determine a position of a finger of the cardholder on the touch screen of the terminal each time the finger of the cardholder touches the touch screen of the terminal.

4. The terminal according to claim 1, wherein the transaction management module comprises an arrangement for at least configuring the terminal, which, when executed by the processor of the terminal, causes the processor of the terminal to implement, if the cardholder mobile device is not detected by the wire/wireless communication device, an accessibility mode wherein, at least, the processor of the terminal is configured to:
- ask by a notification the connection of a headset in the jack connector of the terminal;
- execute the accessibility mode application, after detection by a headset sensor of a jack plugged in for connecting a cardholder headset, the touch screen of the terminal being blackened and maintained blackened during all the sequence of the accessibility mode;
- configure by a set of arrangements the touch screen of the terminal to detect a position of a finger of the cardholder when the cardholder moves the finger on the touch screen of the terminal to select each digit of a PIN code by moving the finger on the touch screen of the terminal; and
- send through the headset pre-registered audio signals corresponding to each position of the finger for helping the cardholder to choose digits of the PIN code.

5. The terminal according to claim 1, wherein the terminal comprises at least a notification which is an audio arrangement, which, when activated by the processor of the terminal, emits a voice message through a speaker, included in the terminal and/or sends the voice message to the cardholder mobile device.

6. The terminal according to claim 1, wherein the terminal comprises a notification which is a text message module, which, when executed by the processor of the terminal, causes the processor of the terminal to display information on the touch screen of the terminal or send the information on the touch screen of the cardholder mobile device.

7. The terminal according to claim 1, wherein the terminal comprises both a text message module and an audio arrangement, which, when executed or activated by the processor of the terminal, cause the processor of the terminal to notify the cardholder through the terminal or the cardholder mobile device.

8. The terminal according to claim 1, wherein the processor of the terminal is configured to send to the cardholder mobile device a set of programs included in the terminal, which, when executed by the processor of the cardholder mobile device, causes the processor of the cardholder mobile device to delete the virtual machine and/or the instant-app running on the virtual machine, from the cardholder mobile device after the validation of the transaction.

9. The terminal according to claim 1, wherein the created virtual machine comprises at least a set of programs, which, when executed by the processor of the cardholder mobile device, causes the processor of the cardholder mobile device to simulate each component of the terminal and their connection so as to implement, when running the instant-app, an accessibility mode comprising at least the accessibility mode as executed by the processor of the terminal.

10. The terminal according to claim 1, wherein the instant-app comprises a set of programs, which, when executed by the processor of the cardholder mobile device, causes the processor of the cardholder mobile device to simulate functionalities of each component of the terminal and their connection so as to implement an accessibility mode comprising at least the accessibility mode as executed by the terminal.

11. The terminal according to claim 1, wherein the instant-app launched by the processor of the terminal on the cardholder mobile device comprises at least a program, which, when executed by the processor of the cardholder mobile device, causes the processor of the cardholder mobile device to respond to the authentication and/or PIN code request sent by the processor of the terminal.

12. The terminal according to claim 1, wherein the instant-app launched by the processor of the terminal on the cardholder mobile device comprises at least a program, which, when executed by the processor of the cardholder mobile device, causes the processor of the cardholder mobile device to
- retrieve from the memory of the cardholder mobile device the set of keys of the sixth memory registered on the cardholder mobile device, and
- respond to the authentication and/or PIN code request sent by the processor of the terminal.

13. The terminal according to claim 1, wherein the processor of the terminal is configured to transmit to the cardholder mobile device, with the PIN code request, transaction information related at least to the amount of the transaction and/or a merchant, said information being registered in a further memory of the terminal.

14. The terminal according to claim 1, wherein the instant-app, running on the processor of the cardholder mobile device, comprises at least a set of programs, which, when executed by the processor of the cardholder mobile device, causes the processor of the cardholder mobile device to
configure the cardholder mobile device,
when at least a PIN code entry request has been sent by the processor of the terminal, perform at least actions including:
checking if a headset is plugged or not in an audio jack connector of the cardholder mobile device;
requesting by a notification the connection of the headset to the cardholder mobile device, if no headset is plugged in; and
launching the accessibility mode for PIN code entry once the headset is plugged in.

15. The terminal according to claim 1, wherein the instant-app running on the cardholder mobile device comprises at least a program, which, when executed by the processor of the cardholder mobile device, causes the processor of the cardholder mobile device to retrieve the set of keys of the sixth memory registered on the cardholder mobile device from the memory of the cardholder mobile device to cipher the PIN code entered by the cardholder and to send the PIN code which has been ciphered to the terminal for the validation of the transaction.

16. The terminal according to claim 1, wherein the instant-app running on the processor of the cardholder mobile device comprises at least a program, which, when executed by the processor of the cardholder mobile device, causes the processor of the cardholder mobile device to
blacken the touch screen of the cardholder mobile device and
maintain the touch screen of the cardholder mobile device blackened during all the sequence of the accessibility mode.

17. The terminal according to claim 1, wherein the instant-app comprises at least a program, which, when executed by the processor of the cardholder mobile device, causes the processor of the cardholder mobile device to configure the touch screen of the cardholder mobile device and to detect a position of a finger of the cardholder when the cardholder moves the finger on the touch screen to select each digit of the PIN code.

18. The terminal according to claim 1, wherein the instant-app comprises at least a program, which, when executed by the processor of the cardholder mobile device, causes the processor of the cardholder mobile device to configure the cardholder mobile device and to send through the headset pre-registered audio signals corresponding to each position of a finger of the cardholder for helping the cardholder to choose digits of the PIN code, the pre-registered audio signals being transmitted to the cardholder mobile device with the transaction information and the PIN code requested by the processor of the terminal.

19. The terminal according to claim 1, wherein the instant-app comprises at least a program, which, when executed by the processor of the cardholder mobile device, causes the processor of the cardholder mobile device to configure the cardholder mobile device so as to allow the cardholder to enter the PIN code by an authorized third-party application.

20. A method for securing an identification of a cardholder with a portable payment or retail terminal, said method comprising at least the steps of:
detecting a wire/wireless communication device of a cardholder mobile device;
determine the detection of the cardholder mobile device and if the cardholder mobile device is detected:
connecting to the cardholder mobile device;
launching an accessibility mode on the cardholder mobile device;
transmitting a request to the mobile device for sending a PIN code to the terminal; and
receiving a communication from the cardholder mobile device including information, deciphering said information to obtain the PIN code and validating the transaction,
determining that the processor of the terminal checks that no accessibility mode application is installed,
responsive to the determination that no accessibility mode application is installed, launching the execution of the accessibility mode on the processor of the cardholder mobile device,
computing an operation system (OS) to create a virtual machine,
transmitting the created virtual machine to the detected cardholder mobile device,
installing the virtual machine on the processor of the cardholder mobile device,
pushing an instant-app from the terminal to the virtual machine running on the processor of the cardholder mobile device,
pushing a set of keys with the instant-app from the terminal to the virtual machine,
executing the accessibility mode on the cardholder mobile device, and
securing the exchange of data and/or information between the cardholder mobile device and the terminal through the use of the pushed set of keys.

21. The method for securing the identification of the cardholder according to claim 20, wherein the step of launching the accessibility mode includes
checking if an owner accessibility mode application is installed on the cardholder mobile device; and
executing an authentication of said installed accessibility mode application.

22. The method for securing the identification of the cardholder according to claim 20, further comprising the step of ciphering at least the PIN code or a portion of the PIN code on the cardholder mobile device before transmitting the ciphered PIN code or the ciphered portion of the PIN code to the terminal for validation.

23. The method for securing the identification of the cardholder according to claim 20, wherein if the cardholder mobile device is not detected, the method further comprises at least the steps of:
asking by a notification, on the touch screen of the terminal, the connection of a headset in the jack connector of the terminal;
detecting the presence of a jack plugged in the jack connector of the terminal for connecting a cardholder headset;
triggering the execution of a first accessibility mode allowing the cardholder to identify;
blackening the touch screen and maintaining the touch screen blackened during the sequence of the accessibility mode;
configuring the touch screen to detect a position of a finger of the cardholder when said cardholder moves the finger on the touch screen to select each digit of the PIN code; and
sending through the headset pre-registered audio signals corresponding to each position of the finger for helping the cardholder to choose digits of the PIN code.

24. The method for securing the identification of the cardholder according to claim 20, wherein the step of executing the accessibility mode on the cardholder mobile device comprises the steps of:
- checking if a headset is plugged or not in an audio jack connector of the cardholder mobile device;
- requesting the connection of the headset to the cardholder mobile device, if no headset is plugged in; and
- launching the accessibility mode for PIN code entry once the headset is plugged in.

\* \* \* \* \*